United States Patent [19]

Yamauchi et al.

[11] Patent Number: 4,780,104

[45] Date of Patent: Oct. 25, 1988

[54] REACTIVE DYE-CONTAINING AQUEOUS LIQUID COMPOSITION

[75] Inventors: Noriaki Yamauchi, Hirakata; Kunihiko Imada, Sakai; Shinei Ikeou, Hirakata, all of Japan

[73] Assignee: Sumitomo Chemical Company, Limited, Osaka, Japan

[21] Appl. No.: 17,054

[22] Filed: Feb. 20, 1987

[30] Foreign Application Priority Data

Feb. 27, 1986 [JP] Japan ................................. 61-43444

[51] Int. Cl.$^4$ ........................ C09B 67/26; D06P 1/38
[52] U.S. Cl. ......................................... 8/527; 8/549; 8/564; 8/661; 8/677; 8/679; 8/681; 8/684; 8/686; 8/687; 8/688; 8/917; 8/918; 8/919; 8/924
[58] Field of Search ........................... 8/527, 549, 564

[56] References Cited

U.S. PATENT DOCUMENTS

| | | | |
|---|---|---|---|
| 4,083,689 | 4/1978 | Wolf et al. | 8/564 |
| 4,120,648 | 10/1978 | Agarwal et al. | 8/564 |
| 4,331,442 | 5/1982 | Uhlig et al. | 8/564 |
| 4,602,915 | 7/1986 | Wolff et al. | 8/527 |

FOREIGN PATENT DOCUMENTS

1060063 2/1967 United Kingdom .

*Primary Examiner*—A. Lionel Clingman
*Attorney, Agent, or Firm*—Stevens, Davis, Miller & Mosher

[57] ABSTRACT

An aqueous liquid dye composition comprising 5 to 50% by weight of a reactive dye represented by the following formula,

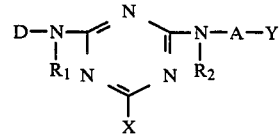

wherein D denotes a sulfo group-containing organic dye residue, $R_1$ and $R_2$ independently of one another denote a hydrogen atom or a $C_1$ to $C_4$ alkyl group unsubstituted or substituted with a halogen atom or a hydroxyl, cyano, $C_1$ to $C_4$ alkoxy, carboxy, carbamoyl, $C_1$ to $C_4$ alkoxycarbonyl, $C_1$ to $C_4$ alkylcarbonyloxy, sulfo or sulfamoyl group, A denotes a phenylene group unsubstituted or substituted with one or two members selected from methyl, ethyl, methoxy, ethoxy, chlorine, bromine and sulfo, or a naphthylene group unsubstituted or substituted with one sulfo group, X denotes a halogen atom, and Y is a group of $-SO_2CH=CH_2$ or $-SO_2CH_2CH_2Z$ in which Z is a splittable group by the action of an alkali, 0.1 to 10% by weight of ε-caprolactam and the balance of water, the composition having a pH value of 3 to 7, which can be stored for a long period of time at a low temperature such as 5° C. or lower without deterioration in its solution state.

7 Claims, No Drawings

REACTIVE DYE-CONTAINING AQUEOUS LIQUID COMPOSITION

The present invention relates to a reactive dye-containing aqueous liquid composition excellent in storage stability at a low temperature and a method for dyeing or printing fiber materials using the composition.

Industrial dyeing or printing of fiber materials with reactive dyes has been carried out usually in an aqueous medium, and when used for the dyeing or printing, the reactive dyes commercially available in the form of powder or granule must be dissolved in the aqueous medium using hot water.

In recent years, dyeing or printing systems in a dye house have been actively mechanized and automated in many aspects, and therefore the reactive dyes have been eagerly required to be made into a form suitable for an automatic weighing and dispensing system.

An aqueous liquid composition of the reactive dye is now considered to be very favorable, because it is suitable for the automatic weighing and dispensing system and causes no powder-scattering on the handling, resulting in no pollution of a working environment, and moreover it can serve saving energy and labor. Thus, it has been required to make a reactive dye-containing aqueous liquid composition having no problem from industrial point of view.

In general, however, although the reactive dye-containing aqueous liquid composition is relatively stable at ordinary temperatures, it is natural that in the winter the aqueous liquid composition is allowed to stand at a temperature of 5° C. or lower through manufacturing, custody, transportation, shipment, storage or the like, so that the reactive dye contained therein lowers its solubility and then precipitates.

A reactive dye of the following formula (I),

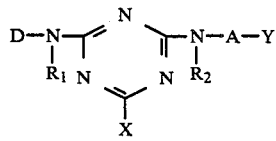

wherein D denotes a sulfo group-containing organic dye residue, $R_1$ and $R_2$ independently of one another denote a hydrogen atom or a $C_1$ to $C_4$ alkyl group unsubstituted or substituted with a halogen atom or a hydroxyl, cyano, $C_1$ to $C_4$ alkoxy, carboxy, carbamoyl, $C_1$ to $C_4$ alkoxycarbonyl, $C_1$ to $C_4$ alkylcarbonyloxy, sulfo or sulfamoyl group, A denotes a phenylene group unsubstituted or substituted with one or two members selected from methyl, ethyl, methoxy, ethoxy, chlorine, bromine and sulfo, or a naphthylene group unsubstituted or substituted with one sulfo group, X denotes a halogen atom, and Y is a group of $-SO_2CH=CH_2$ or $-SO_2CH_2CH_2Z$ in which Z is a splittable group by the action of an alkali, has been extensively used for dyeing or printing fiber materials because of its characteristic dye performances, but it is easy to precipitate at a low temperature such as 5° C. or lower, because of its relatively low solubility in water. If the reactive dyes of the formula (I) are formed into an aqueous liquid composition in a conventional manner, the liquid composition is easy to precipitate the reactive dye at a low temperature. If the precipitate-containing liquid composition is used as it is for the dyeing or printing, there are caused problems due to inaccuracy of the weighing as well as troubles such as pipe-stopping of automatic weighing and dispensing devices. While, in order to dissolve the precipitate, it is necessary to heat the liquid composition to a temperature of about 80° C. In this case, however, there are many problems to be solved with respect to the operation and stability of the reactive dye per se at such a high temperature.

The present inventors have undertaken extensive studies to improve the aqueous liquid composition containing such reactive dyes having problems in the dissolution stability at a low temperature, and as a result found that incorporation of ε-caprolactam can solve such problems.

The present invention provides an aqueous liquid dye composition comprising 5 to 50% by weight of the reactive dye of the above formula (I), 0.1 to 10% by weight of ε-caprolactam and the balance of water, the composition having a pH value of 3 to 7.

With respect to the reactive dyes of the formula (I) usable in the present invention, the residue D of sulfo group-containing organic dyes includes, for example, residues of monoazo dyes, polyazo dyes such as bisazo dyes, metal complex monoazo and bisazo dyes, metal formazan dyes, anthraquinone dyes, metal phthalocyanine dyes, stilbene dyes, oxazine dyes, dioxazine dyes, triphenylmethane dyes, phenazine dyes, xanthene dyes, thioxanthene dyes, naphthoquinone dyes, pyrenequinone dyes, perilenetetracarboimide dyes, nitro- or azomethine dyes and the like. The metal in the metal complex azo, metal formazan and metal phthalocyanine dyes include Cu, Cr, Co, Ni, Fe and the like.

The alkyl group represented by $R_1$ and $R_2$ may be unsubstituted or substituted with a member preferably selected from hydroxy, cyano, alkoxy, halogeno, carboxy, carbamoyl, alkoxycarbonyl, $C_1$ to $C_4$ alkylcarbonyloxy, sulfo, sulfamoyl and the like.

Preferable examples of $R_1$ and $R_2$ are hydrogen, methyl, ethyl, n-propyl, iso-propyl n-butyl, iso-butyl, sec-butyl, 2-hydroxyethyl, 2-hydroxypropyl, 3-hydroxypropyl, 2-hydroxybutyl, 3-hydroxybutyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like.

Examples of the phenylene and naphthylene groups represented by A area as follows:

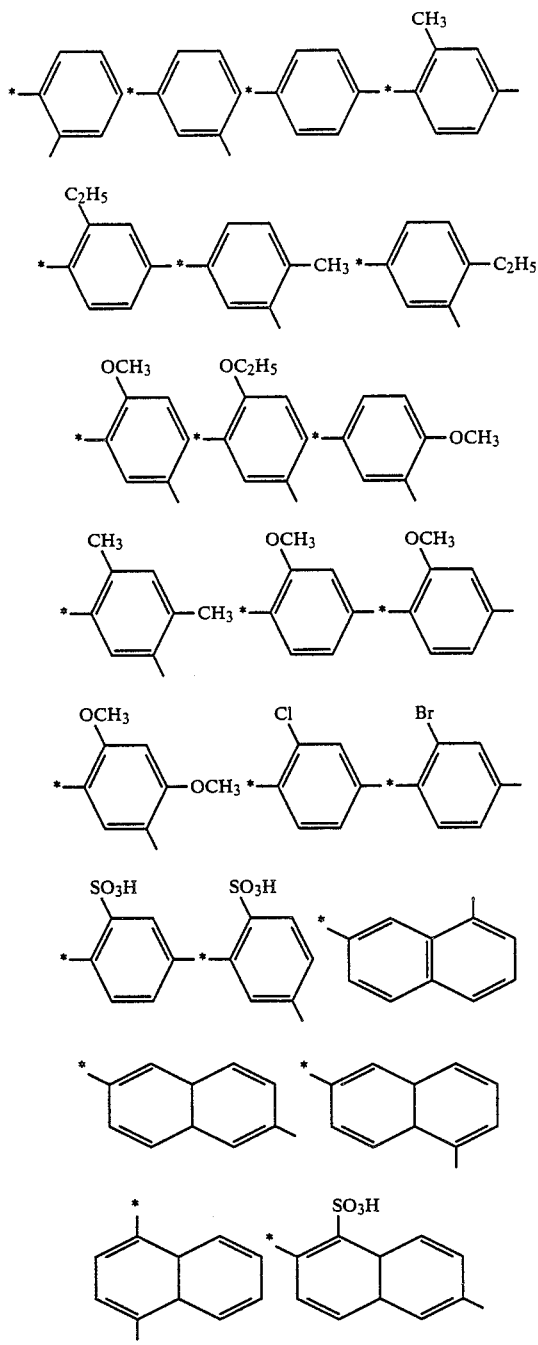

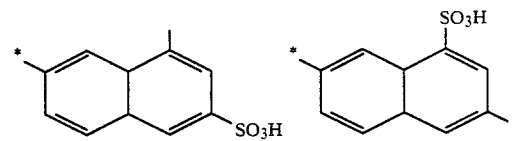

(In the above formulae, the asterisked linkage is intended to mean the linkage to the group, $-NR_1-$.)

The halogen represented by X includes chlorine and fluorine.

The splittable group represented by Z includes sulfuric acid ester group, thiosulfuric acid ester group, phosphoric acid ester group, acetic acid ester group and halogen atoms.

The reactive dye of the formula (I) can be produced, for example, by subjecting any one of an amine compound represented by the following formula (II),

(II)

wherein D and $R_1$ are as defined above, or an aromatic amine compound represented by the following formula (IV),

(IV)

wherein $R_2$, A and Y are as defined above, to condensation with a trihalogenotriazine represented by the following formula (III),

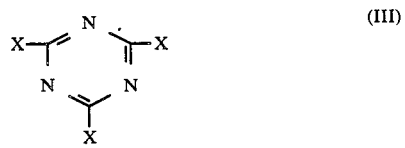

(III)

wherein X is as defined above, followed by condensation with the remaining one of (IV) or (II).

Among the reactive dyes of the formula (I), particularly preferred ones are exemplified as follows:

1. Monoazo dyes

Pyridone dyes                    Pyrazolone dyes

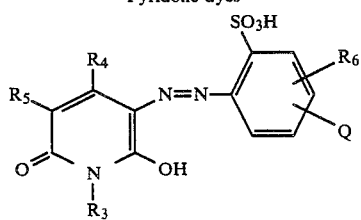    Ia    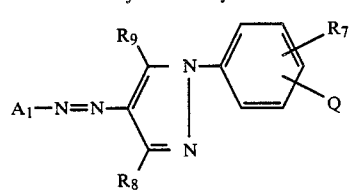    Ib

Acetoacetic acid anilide dyes      Naphthalene dyes

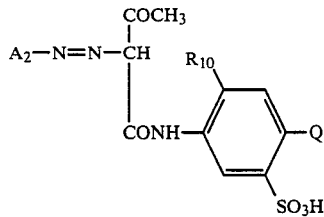
Ic
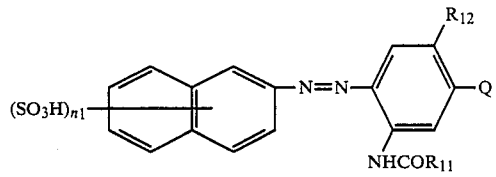
Id
J acid dyes
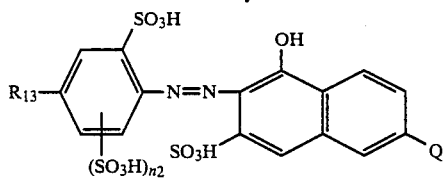
Ie
H acid or K acid dyes
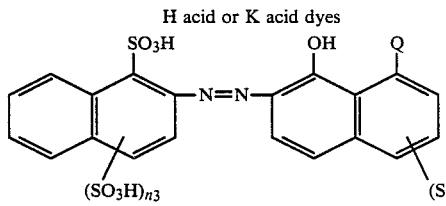
If
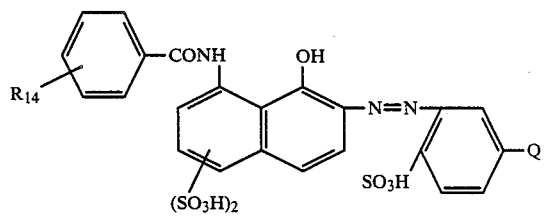
2. Bisazo dyes
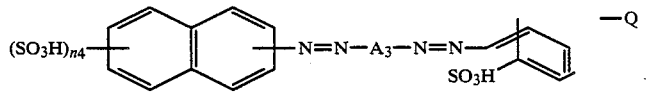
Ig
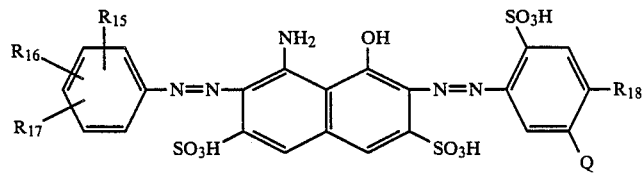
Ih
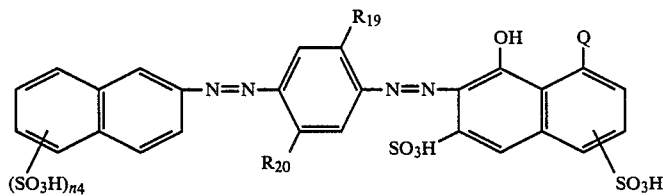
Ii
3. Metal bisazo-dyes
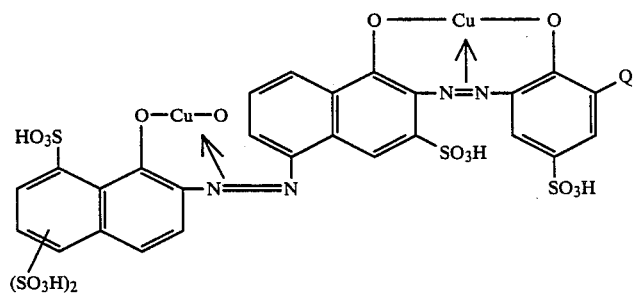
Ij -continued

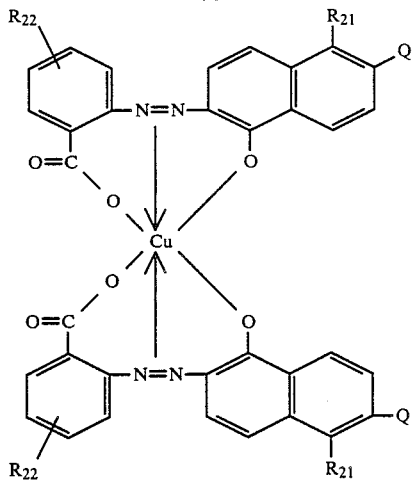
Ik

4. Phthalocyanine dyes

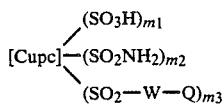
Il

5. Anthraquinone dyes

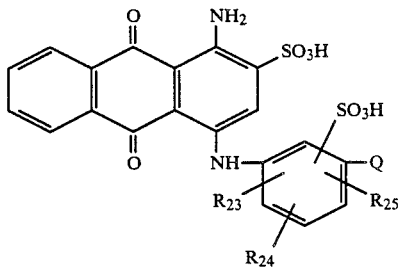
Im

6. Formazan dyes

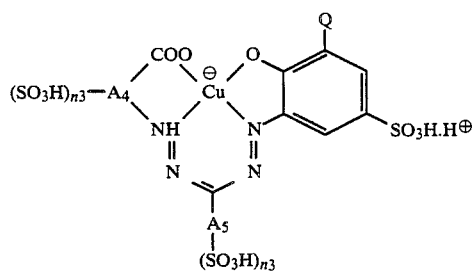
In

7. Dioxazine dyes

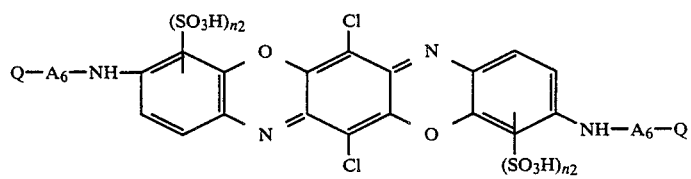

In the above formulas, definitions of all symbols are as follows:

$R_3$: hydrogen or $C_1$-$C_4$ alkyl,
$R_4$: $C_1$-$C_4$ alkyl,
$R_5$: hydrogen, cyano, —$CONH_2$ or sulfo-$C_1$-$C_4$ alkyl,
$R_6$: hydrogen or sulfo,
$R_7$: hydrogen, sulfo or $C_1$-$C_4$ alkyl,
$R_8$: methyl, carboxy or methoxycarbonyl,
$R_9$: hydroxy or amino,
$R_{10}$: methoxy, ethoxy or sulfo,
$R_{11}$: methyl, amino or phenyl,
$R_{12}$: $C_1$-$C_4$ alkyl,
$R_{13}$: $C_1$-$C_4$ alkyl or $C_1$-$C_4$ alkoxy,
$R_{14}$: hydrogen, nitro, sulfo, chloro, carboxy, $C_1$-$C_4$ alkyl or the like,
$R_{15}$, $R_{16}$, $R_{17}$: hydrogen, chloro, methyl, methoxy, sulfo or carboxy,
$R_{18}$: hydrogen or methyl,
$R_{19}$, $R_{20}$: hydrogen, $C_1$-$C_4$ alkyl or $C_1$-$C_4$ alkoxy,
$R_{21}$: hydrogen or sulfo,
$R_{22}$: hydrogen, $C_1$-$C_4$ alkyl, $C_1$-$C_4$ alkoxy, sulfo or acetylamino,
$R_{23}$, $R_{24}$, $R_{25}$: $C_1$-$C_4$ alkyl, $A_1$: unsaturated or substituted phenylene (examples of the substituent being 1 to 3 members selected from methyl, ethyl, methoxy, ethoxy, halogen, acetylamino, propionylamino, nitro, sulfo and carboxy) or naphthalene unsubstituted or substituted with 1 to 3 sulfoes, $A_2$: sulfophenyl substituted with methyl, ethyl, methoxy, ethoxy, phenoxy, acetylamino, propionylamino, HOOCCH$_2$CH$_2$CONH— or HOOCCH=CH—CONH—, or naphthylene substituted with two or three sulfoes, $A_3$: residue of naphthalenesulfonic acids such as H acid and K acid, $A_4$: unsubstituted or substituted phenylene (examples of the substituents being halogen, nitro, $C_1$-$C_4$ alkyl, $C_1$-$C_4$ alkoxy, sulfamoyl, N— or N,N—di—$C_1$-$C_4$ alkylsulfamoyl, $C_1$-$C_4$ alkylsulfonyl or phenylsulfonyl), $A_5$: unsubstituted or substituted phenylene (examples of the substituents being methyl, ethyl, methoxy, ethoxy, halogen or sulfamoyl), $A_6$: phenylene or naphthylene unsubstituted or substituted 1 to 3 sulfoes, W: aminoalkyl residue such as

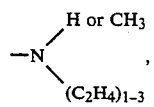

$m_1$: 1 or 2,
$m_2$: 0, 1 or 2,
$m_3$: 1 or 2, provided that $m_1+m_2+m_3 \leq 4$,
$n_1$: 2 or 3,
$n_2$: 0 or 1,
$n_3$: 1 or 2,
$n_4$: 1, 2 or 3,
Q: —SO$_2$CH$_2$CH$_2$Z (Z being as defined above), preferably —SO$_2$CH$_2$CH$_2$OSO$_3$H.

In the production of the aqueous liquid composition in accordance with the present invention, the reactive dye-containing reaction mixture obtainable, for example, through the production method described above, may be used as it is. When the reaction mixture contains too large amount of water, the dye content can be controlled in a manner such that the reaction mixture may be concentrated, for example, by evaporation of a part of water in vacuo, or the reactive dye powder obtainable by drying a part of the reaction mixture may be mixed with the remaining reaction mixture. Alternatively, a wet cake obtainable through conventional manners such as salting out of the reaction mixture and filtration, or a powder obtainably by drying the wet cake, may be used for the production of the present aqueous liquid composition by dissolving it in a pre-determined amount of water.

The content of the reactive dye can be determined within a range of 5 to 50% by weight based on the weight of the aqueous liquid composition depending on the solubility of the reactive dye to be used, amounts of ε-caprolactum, inorganic salts usually inevitably contained therein, and other additives, if any, and other factors such as needs of the industrial world.

ε-Caprolactam is used in an amount of from 0.1 to 10% by weight, preferably from 0.5 to 8% by weight, based on the weight of the aqueous liquid composition.

The aqueous liquid composition of the present invention may contain other additives such as pH buffers, surfactants, dyeing auxiliary agents, hydrotropic agents, defoaming agents, antifreezing agents, antiseptics and the like. The pH buffers are those inert to the reactive dye, and include, for example, sodium or potassium acetate, sodium or potassium oxalate, sodium borate, sodium or potassium phosphates, and a mixture thereof.

The aqueous liquid composition can be prepared, for example, in the following manner.

An aqueous solution of the reactivve dye is mixed with the pre-determined amount of the additives including ε-caprolactam to form a clear solution, and the clear solution is adjusted to a pH within a range of 3 to 7 using an acid such as sulfuric acid, hydrochloric acid, acetic acid and the like, or an alkali such as sodium hydroxide, sodium carbonate and the like. Thereafter, water is added to the clear solution to obtain the reactive dye-containing aqueous liquid composition having the desired dye content.

Notwithstanding a relatively high content of inorganic salts because of the reactive dye being used as it is without removal of the inorganic salts, the aqueous liquid composition prepared in accordance with the present invention can be stably stored for a long period of time at a low temperature of 5° C. or below, for example, no precipitation of the reactive dye appears even after storage for 2 months at 0° C.

Moreover, a low viscosity (about 10 cps or lower) of the present aqueous liquid composition can be stably kept for a long period of time, and therefore the present composition can be applied to various kinds of automatic weighing and dispensing devices.

The present aqueous liquid composition can be used by dyeing or printing natural or synthetic fiber materials, particularly such as paper, cellulose fibers, polyamide fibers, wools and the like in a conventional manner, thereby giving dyed products which are equal to those obtainable using the reactive dye in the form of powder or granule.

The pesent invention is illustrated in more detail with reference to the following Examples, which are only illustrative and not intended to limit the scope of the present invention. In Examples, parts and % are by weight.

EXAMPLE 1

ε-caprolactam (30 parts) was mixed with a reaction mixture (900 parts) which was a dye solution obtained by a known method having 12% in a content of a reactive dye represented by the formula (1) described below, 2% in a sodium chloride content and 1.5% in a sodium sulfate content. The mixture was formed into a clear solution, and sodium accetate (5 parts) was dissolved therein. The resulting solution was adjusted to pH 5.0 using 10% sulfuric acid, and then mixed with water to make the whole 1000 parts. A part of the aqueous liquid composition was stored for 2 months at 0° C. Then, the composition was found to have a stable solution state without precipitation of the reactive dye.

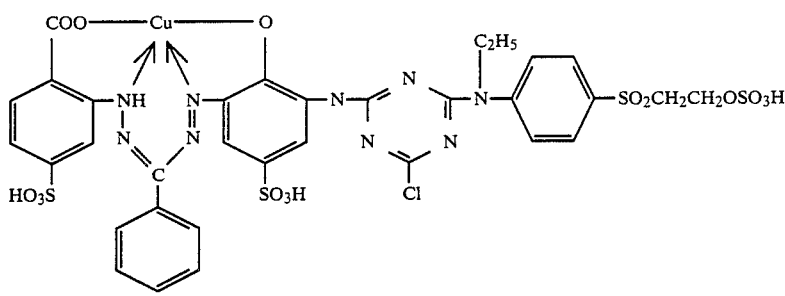

(1)

EXAMPLE 2

ε-caprolactam (30 parts) was mixed with a reaction mixture (900 parts) which was a dye solution obtained by a known method having 11% in a content of a reactive dye represented by the formula (2) described below, 4% in a sodium chloride content and 1% in a sodium sulfate content. The mixture was formed into a clear solution, and sodium acetate (5 parts) was dissolved therein. The resulting solution was adjusted to pH 5.3 using 10% sulfuric acid, and then mixed with water to make the whole 1000 parts. A part of the aqueous liquid composition was stored for 2 months at 0° C. Then, the composition was found to have a stable solution state without precipitation of the reactive dye.

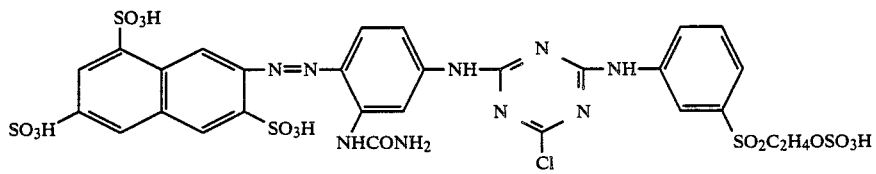

(2)

EXAMPLE 3

ε-Caprolactam (50 parts) was mixed with a reaction mixture (900 parts) which was a dye solution obtained by a known method having 16% in a content of a reactive dye represented by the formula (3) described below, 2% in a sodium chloride content and 1% in a sodium sulfate content. The mixture was formed into a clear solution, and sodium acetate (5 parts) was dissolved therein. The resulting solution was adjusted to pH 5.5 using 10% sulfuric acid, and then mixed with water to make the whole 1000 parts. A part of the aqueous liquid composition was stored for 1 month at 0° C. Then, the composition was found to have a stable solution state without precipitation of the reactive dye.

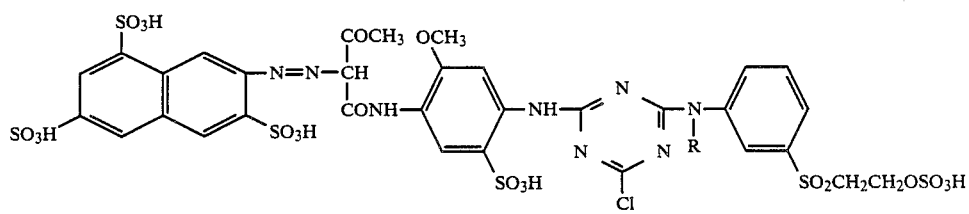

(3)

Mixture of dyes having hydrogen and ethyl as R, respectively.

EXAMPLE 4

ε-Caprolactam (1 part) was mixed with a reaction mixture (900 parts) which was a dye solution obtained by a known method having 20% in a content of a reactive dye represented by the formula (4) described below, 4.5% in a sodium chloride content and 2% in a sodium sulfate content. The mixture was formed into a clear solution, and sodium acetate (10 parts) was dissolved therein. The resulting solution was adjusted to pH 5.3 using 10% sulfuric acid, and then mixed with water to make the whole 1000 parts. A part of the aqueous liquid composition was stored for 2 months at 0° C. Then, the composition was found to have a stable solution state without precipitation of the reactive dye.

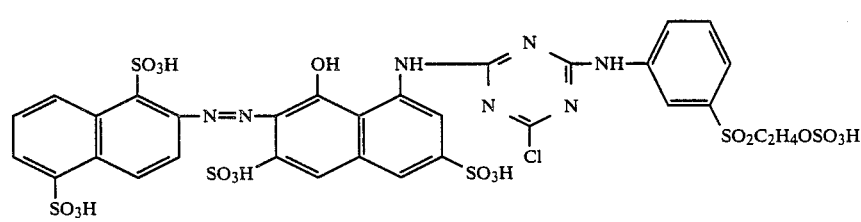

(4)

EXAMPLE 5

ε-Caprolactam (10 parts) was mixed with a reaction mixture (900 parts) which was a dye solution obtained by a known method having 10% in a content of a reactive dye represented by the formula (5) described below, 3% in a sodium chloride content and 1% in a sodium sulfate content. The mixture was formed into a clear solution, and sodium acetate (5 parts) was dissolved therein. The resulting solution was adjusted to pH 5.5 using 10% sulfuric acid, and then mixed with water to make the whole 1000 parts. A part of the aqueous liquid composition was stored for 1 month at 0° C. Then, the composition was found to have a stable solution state without precipitation of the reactive dye.

by a known method having 8% in a content of a reactive dye represented by the formula (7) described below, 1% in a sodium chloride content and 2% in a sodium sulfate content. The mixture was formed into a clear solution, and sodium acetate (5 parts) was dissolved therein. The resulting solution was adjusted to pH 5.5 using 10% sulfuric acid, and then mixed with water to make the whole 1000 parts. A part of the aqueous liquid composition was stored for 2 months at 0° C. Then, the composition was found to have a stable solution state without precipitation of the reactive dye.

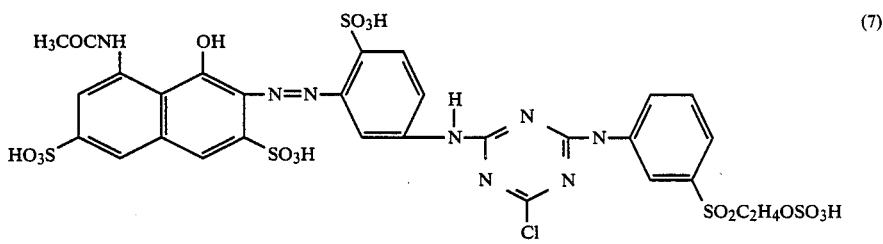

(7)

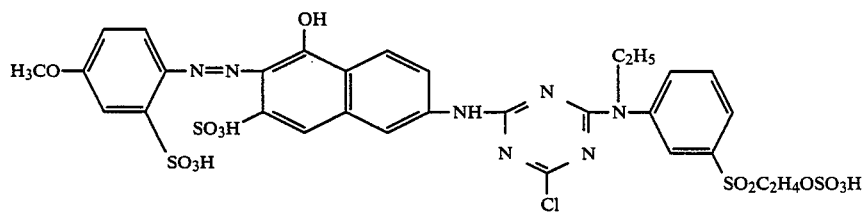

(5)

EXAMPLE 6

ε-Caprolactam (30 parts) was mixed with a reaction mixture (900 parts) which was a dye solution obtained by a known method having 10% in a content of a reactive dye represented by the formula (6) described below, 5% in a solution chloride content and 0.5% in a sodium sulfate content. The mixture was formed into a clear solution, and sodium acetate (5 parts) was dissolved therein. The resulting solution was adjusted to pH 5.5 using 10% sulfuric acid, and then mixed with water to make the whole 1000 parts. A part of the aqueous liquid composition was stored for 2 months at 5° C. Then, the composition was found to have a stable solution state without precipitation of the reactive dye.

EXAMPLE 8

A reactive dye of the formula (8) described below was produced by a known method, wherein the reaction mixture was subjected to salting-out, followed by filtration to obtain a wet cake, and a slurry-like mixture formed by mixing the wet cake with water was spray-dried. The powder obtained (180 parts) having 15% in a sodium chloride content and 3% in a sodium sulfate content was mixed with hot water (750 parts) of 50° C., and the mixture was stirred for 1 hour at 55° C. to make a clear solution. Thereafter, the dye solution was allowed to cool to ambient temperature, and ε-caprolactam (20 parts) and sodium acetate (5 parts) were dissolved therein in the order. The resulting solution was adjusted to pH 5.3 using 10% sulfuric acid, and mixed with water to make the whole 1000 parts. A part of the aqueous liquid composition obtained was stored for 2 months at 0° C. Then, the composition was found to

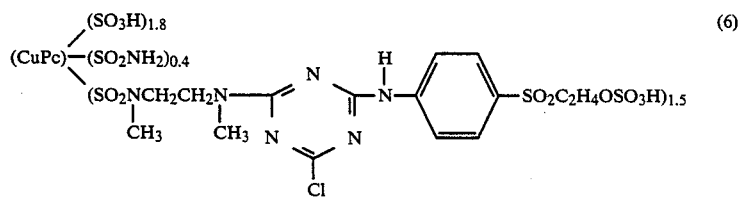

(6)

EXAMPLE 7

ε-Caprolactam (20 parts) was mixed with a reaction mixture (900 parts) which was a dye solution obtained have a stable solution state without precipitation of the reactive dye.

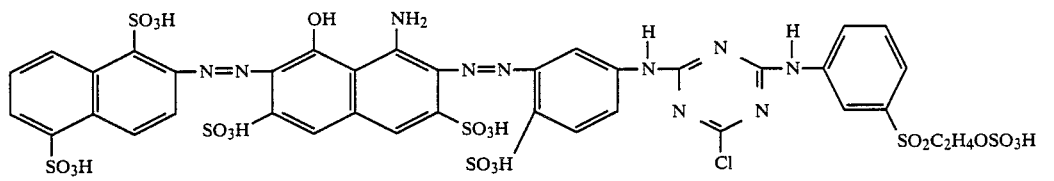

(8)

EXAMPLE 9

A reactive dye of the formula (9) described below was produced by a known method, wherein the reaction mixture was subjected to salting-out, followed by filtration to obtain a wet cake, and a slurry-like mixture formed by mixing the wet cake with water was spray-dried. The powder obtained (150 parts) having 18% in a sodium chloride content and 4% in a sodium sulfate content was mixed with hot water (800 parts) of 50° C., and the mixture was stirred for 1 hour at 55° C. to make a clear solution. Thereafter, the dye solution was allowed to cool to ambient temperature, and ε-caprolactam (20 parts) and sodium acetate (5 parts) were dissolved therein in the order. The resulting solution was adjusted to pH 5.5 using 10% sulfuric acid, and mixed with water to make the whole 1000 parts. A part of the aqueous liquid composition obtained was stored for 2 months at 5° C. Then, the composition was found to have a stable solution state without precipitation of the reactive dye.

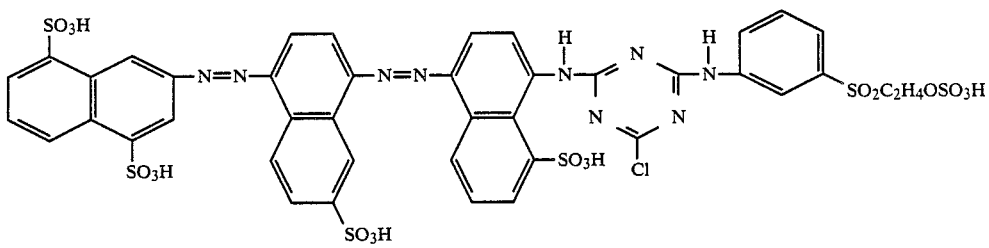

(10)

and the mixture was stirred for 1 hour at 55° C. to make a clear solution. Thereafter, the dye solution was allowed to cool to ambient temperature, and ε-caprolactam (30 parts) and sodium acetate (5 parts) were dissolved therein in the order. The resulting solution was adjusted to pH 5.5 using 10% sulfuric acid, and mixed with water to make the whole 1000 parts. A part of the aqueous liquid composition obtained was stored for 2 months at 5° C. Then, the composition was found to have a stable solution state without precipitation of the reactive dye.

EXAMPLE 11

A reactive dye of the formula (11) described below was produced by a known method, wherein the reaction mixture was subjected to salting out, followed by filtration to obtain a wet cake, a slurry-like mixture formed by mixing the wet cake with water was spray-dried. The powder obtained (180 parts) having 18% in a sodium chloride content and 5% in a sodium sulfate content was mixed with hot water (750 parts) of 50° C., and the mixture was stirred for 1 hour at 55° C. to make

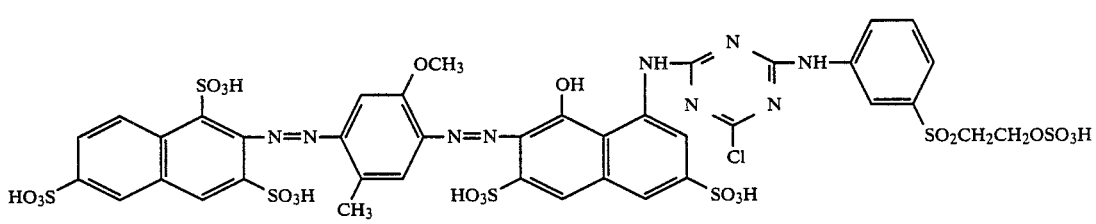

(9)

EXAMPLE 10

A reactive dye of the formula (10) described below was produced by a known method, wherein the reaction mixture was subjected to salting-out, followed by filtration to obtain a wet cake, and a slurry-like mixture formed by mixing the wet cake with water was spray-dried. The powder obtained (140 parts) having 13% in a sodium chloride content and 3% in a sodium sulfate content was mixed with hot water (800 parts) of 50° C., and the mixture was stirred for 1 hour at 55° C. to make a clear solution. Thereafter, the dye solution was allowed to cool to ambient temperature, and ε-caprolactam (30 parts) and sodium acetate (5 parts) were dissolved therein in the order. The resulting solution was adjusted to pH 5.3 using 10% sulfuric acid, and mixed with water to make the whole 1000 parts. A part of the aqueous liquid composition obtained was stored for 2 months at 0° C. Then, the composition was found to have a stable solution state without precipitation of the reactive dye.

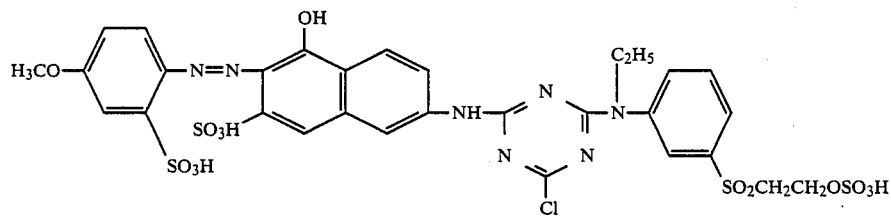

(11)

What is claimed is:

1. An aqueous liquid dye composition comprising 5 to 50% by weight of a reactive dye represented by the following formula,

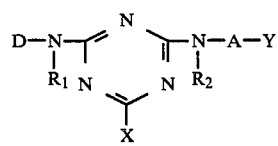

wherein D denotes a sulfo group-containing organic dye residue, $R_1$ and $R_2$ independently of one another denote a hydrogen atom or a $C_1$ to $C_4$ alkyl group unsubstituted or substituted with a halogen atom or a hydroxyl, cyano, $C_1$ to $C_4$ alkoxy, carboxy, carbamoyl, $C_1$ to $C_4$ alkoxycarbonyl, $C_1$ to $C_4$ alkylcarbonyloxy, sulfo or sulfamoyl group, A denotes a phenylene group unsubstituted or substituted with one or two members selected from methyl, ethyl, methoxy, ethoxy, chlorine, bromine and sulfo, or a naphthylene group unsubstituted or substituted with one sulfo group, X denotes a halogen atom, and Y is a group of $-SO_2CH=CH_2$ or $-SO_2CH_2CH_2Z$ in which Z is a splittable group by the action of an alkali, 0.1 to 10% by weight of ε-caprolactam and the balance of water, the composition having a pH value of 3 to 7.

2. The aqueous liquid dye composition according to claim 1, wherein the reactive dye is at least one member selected from reactive dyes represented by the following formulae in each free acid form,

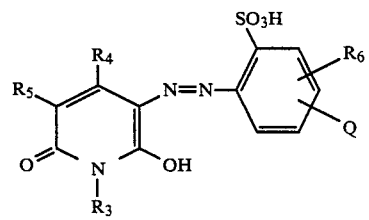

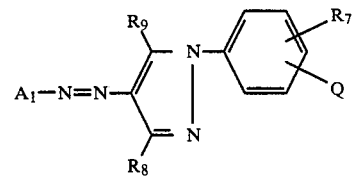

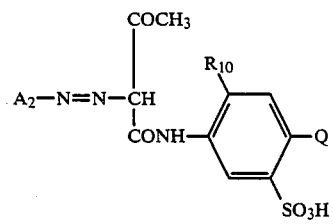

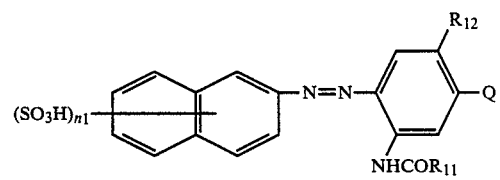

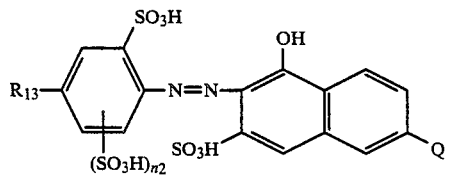

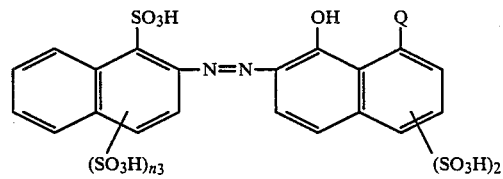

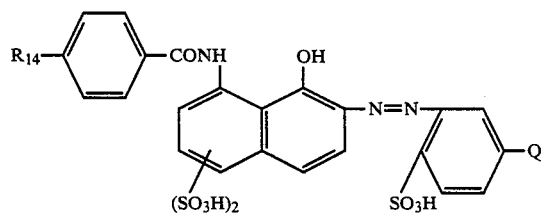

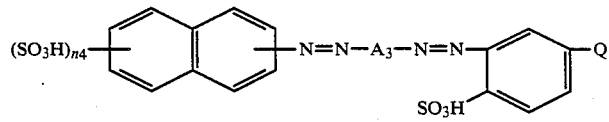

-continued
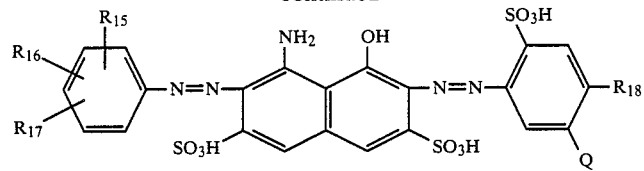
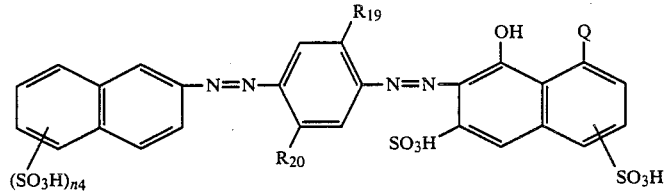
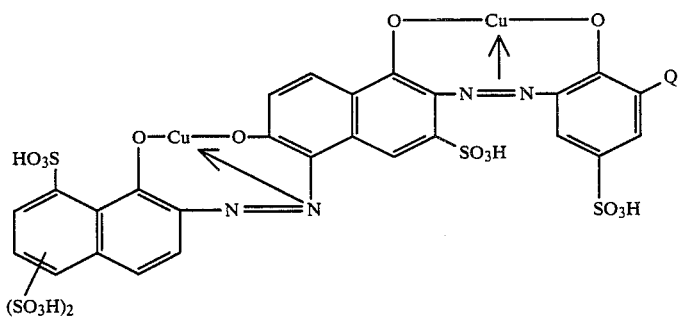
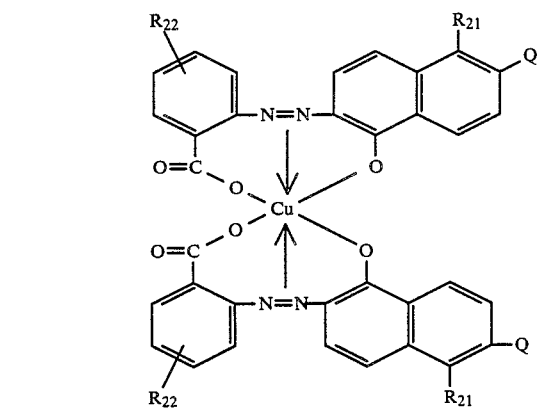
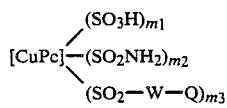
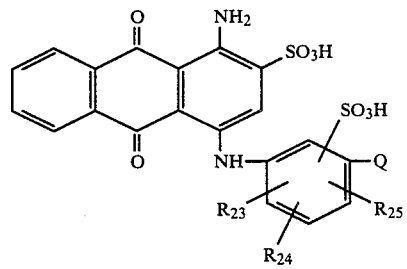
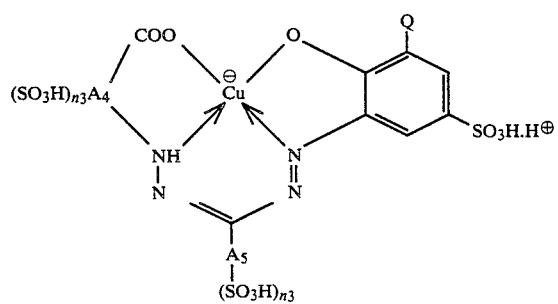

-continued

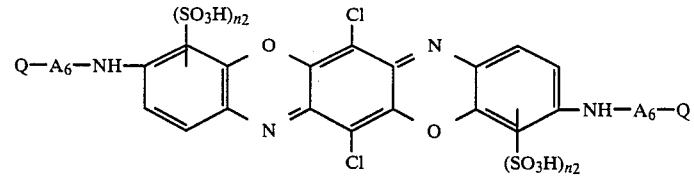

wherein
$R_3$ is hydrogen or $C_1$-$C_4$ alkyl,
$R_4$ is $C_1$-$C_4$ alkyl,
$R_5$ is hydrogen, cyano, —$CONH_2$ or sulfo-$C_1$-$C_4$ alkyl,
$R_6$ is hydrogen or sulfo,
$R_7$ is hydrogen, sulfo or $C_1$-$C_4$ alkyl,
$R_8$ is methyl, carboxy or methoxycarbonyl,
$R_9$ is hydroxy or amino,
$R_{10}$ is methoxy, ethoxy or sulfo,
$R_{11}$ is methyl, amino or phenyl,
$R_{12}$ is $C_1$-$C_4$ alkyl,
$R_{13}$ is $C_1$-$C_4$ alkyl or $C_1$-$C_4$ alkoxy,
$R_{14}$ is hydrogen, nitro, sulfo, chloro, carboxy or $C_1$-$C_4$ alkyl,
$R_{15}$, $R_{16}$ and $R_{17}$ are independently hydrogen, chloro, methyl, methoxy, sulfo or carboxy,
$R_{18}$ is hydrogen or methyl,
$R_{19}$ and $R_{20}$ are independently hydrogen, $C_1$-$C_4$ alkyl or $C_1$-$C_4$ alkoxy,
$R_{21}$ is hydrogen or sulfo,
$R_{22}$ is hydrogen, $C_1$-$C_4$ alkyl, $C_1$-$C_4$ alkoxy, sulfo or acetylamino,
$R_{23}$, $R_{24}$ and $R_{25}$ are independently $C_1$-$C_4$ alkyl,
$A_1$ and $A_6$ are independently unsubstituted or substituted phenylene or naphthylene,
$A_2$ is sulfophenyl substituted with methyl, ethyl, methoxy, ethoxy, phenoxy, acetylamino, propionylamino, $HOOCCH_2CH_2CONH$— or $HOOCCH=CHCONH$—, or naphthylene substituted with two or three sulfoes,
$A_3$ is a residue of naphthalenesulfonic acids,
$A_4$ and $A_5$ are independently phenylene unsubstituted or substituted,
W is aminoalkyl residue,
$m_1$ is 1 or 2,
$m_2$ is 0, 1 or 2,
$m_3$ is 1 or 2, provided that $m_1+m_2+m_3$ 4,
$n_1$ is 2 or 3,
$n_2$ is 0 or 1,
$n_3$ is 1 or 2,
$n_4$ is 1, 2, or 3, and
Q is —$SO_2CH_2CH_2Z$ in which Z is as defined in claim 1.

3. The aqueous liquid dye composition according to claim 1, wherein the composition comprises at least one buffer selected from sodium or potassium acetate, sodium or potassium oxalate, sodium borate and sodium or potassium phosphates.

4. The aqueous liquid dye composition according to claim 3, wherein the composition further comprises at least one member selected from surfactants, dyeing auxiliary agents, hydrotropic agents, defoaming agents, antifreezing agents and antiseptics.

5. A method for preparing an aqueous liquid dye composition, which comprises dissolving in water a predetermined amount of a reactive dye represented by the following formula,

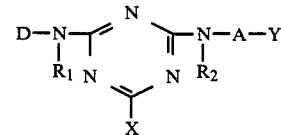

wherein D denotes a sulfo group-containing organic dye residue, $R_1$ and $R_2$ independently of one another denote a hydrogen atom or $C_1$ to $C_4$ alkyl group unsubstituted or substituted with a halogen atom or a hydroxy, cyano, $C_1$ to $C_4$ alkoxy, carboxy, carbamoyl, $C_1$ to $C_4$ alkoxycarbonyl, $C_1$ to $C_4$ alkylcarbonyloxy, sulfo or sulfamoyl group, A denotes a phenylene group unsubstituted or substituted with one or two members selected from methyl, ethyl, methoxy, ethoxy, chlorine, bromine and sulfo, or a naphthylene group unsubstituted or substituted with one sulfo group, X denotes a halogen atom, and Y is a group of —$SO_2CH=CH_2$ or —$SO_2CH_2CH_2Z$ in which Z is a splittable group by the action of an alkali, dissolving a pre-determined amount of $\epsilon$-caprolactam in the dye solution, adjusting the pH of the resulting solution within a range of 3 to 7, and adding water into the solution to make the dye content and an $\epsilon$-caprolactam content 5 to 50% by weight, and 0.1 to 10% by weight, respectively, based on the weight of the aqueous liquid dye composition.

6. A method for storing an aqueous liquid dye composition, which comprises preparing an aqueous liquid dye composition comprising 5 to 50% by weight of a reactive dye represented by the following formula,

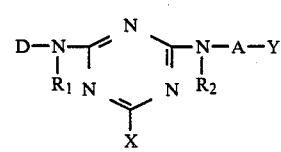

wherein D denotes a sulfo group-containing organic dye residue, $R_1$ and $R_2$ independently of one another denote a hydrogen atom or a $C_1$ to $C_4$ alkyl group unsubstituted or substituted with a halogen atom or a hydroxyl, cyano, $C_1$ to $C_4$ alkoxy, carboxy, carbamoyl, $C_1$ to $C_4$ alkoxy-carbonyl, $C_1$ to $C_4$ alkylcarbonyloxy, sulfo or sulfamoyl group, A denotes a phenylene group unsubstituted or substituted with one or two members selected from methyl, ethyl, methoxy, ethoxy, chlorine, bromine and sulfo, or a naphthylene group unsubstituted or substituted with one sulfo group, X denotes a halogen atom, and Y is a group of —$SO_2CH=CH_2$ or —$SO_2CH_2CH_2Z$ in which Z is a splittable group by the action of an alkali, 0.1 to 10% by weight of $\epsilon$-caprolactam and the balance of water, the composition having a pH value of 3 to 7, and storing the composition in a closed vessel.

7. A method for dyeing fiber materials, said materials comprising a fiber selected from the group consisting of paper, cellulose, polyamide and wool, which comprises applying to the material an aqueous liquid dye composition comprising 5 to 50% by weight of a reactive dye represented by the following formula,

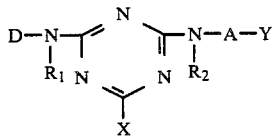

wherein D denotes a sulfo group-containing organic dye residue, $R_1$ and $R_2$ independently of one another denote a hydrogen atom or a $C_1$ to $C_4$ alkyl group unsubstituted or substituted with a halogen atom or a hydroxyl, cyano, $C_1$ to $C_4$ alkoxy, carboxy, carbamoyl, $C_1$ to $C_4$ alkoxy-carbonyl, $C_1$ to $C_4$ alkylcarbonyloxy, sulfo or sulfamoyl group, A denotes a phenylene group unsubstituted or substituted with one or two members selected from the group consisting of methyl, ethyl, methoxy, ethoxy, chlorine, bromine and sulfo, or a naphthylene group unsubstituted or substituted with one sulfo group, X denotes a halogen atom, and Y is $-SO_2CH=CH_2$ or $-SO_2CH_2CH_2Z$ in which Z is a group splittable by the action of an alkali, 0.1 to 10% by weight of ε-caprolactam and the balance of water, the composition having a pH value of 3 to 7.

* * * * *